United States Patent
Li et al.

(10) Patent No.: US 9,936,483 B2
(45) Date of Patent: Apr. 3, 2018

(54) CONTROL INFORMATION PROCESSING METHOD AND DEVICE

(71) Applicant: ZTE CORPORATION, Shenzhen (CN)

(72) Inventors: Yu Ngok Li, Shenzhen (CN); Jun Xu, Shenzhen (CN); Senbao Guo, Shenzhen (CN); Yunfeng Sun, Shenzhen (CN); Junfeng Zhang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 434 days.

(21) Appl. No.: 14/419,295

(22) PCT Filed: Aug. 2, 2013

(86) PCT No.: PCT/CN2013/080769
§ 371 (c)(1),
(2) Date: Feb. 3, 2015

(87) PCT Pub. No.: WO2014/019550
PCT Pub. Date: Feb. 6, 2014

(65) Prior Publication Data
US 2015/0208400 A1 Jul. 23, 2015

(30) Foreign Application Priority Data

Aug. 3, 2012 (CN) .......................... 2012 1 0275395

(51) Int. Cl.
*H04W 72/04* (2009.01)
*H04L 5/00* (2006.01)
*H04L 12/18* (2006.01)

(52) U.S. Cl.
CPC ....... *H04W 72/0406* (2013.01); *H04L 5/0091* (2013.01); *H04L 5/0048* (2013.01); *H04L 12/189* (2013.01)

(58) Field of Classification Search
CPC ................................................ H04W 72/0406
See application file for complete search history.

(56) References Cited

U.S. PATENT DOCUMENTS

2010/0303034 A1* 12/2010 Chen ..................... H04L 5/0023
370/329
2011/0274197 A1* 11/2011 Zhu ....................... H04L 1/0031
375/267

(Continued)

FOREIGN PATENT DOCUMENTS

CN 101834629 A 9/2010
CN 102315870 A 1/2012

(Continued)

OTHER PUBLICATIONS

International Search Report for corresponding application PCT/CN2013/080769 filed Aug. 2, 2013; dated Nov. 7, 2013.

(Continued)

*Primary Examiner* — Hassan Kizou
*Assistant Examiner* — Abdullahi Ahmed
(74) *Attorney, Agent, or Firm* — Cantor Colburn LLP

(57) ABSTRACT

Provided is a control information processing method and device. The method includes: receiving high-layer configuration signalling, wherein the high-layer configuration signalling is used for determining an indication mode of X bits in a control information format, the indication mode of X bits comprises at least one of the following: all of the X bits being used for indicating a first parameter set of at least one enabled transmission block in control information, and the X bits being used for indicating a first parameter set and a second parameter set of at least one enabled transmission block in the control information, where X is a positive integer greater than or equal to 3; and generating a control information format according to the high-layer configuration signalling. The solution solves the problem in the related art (Continued)

```
Receiving high-layer configuration signalling, wherein the high-layer
configuration signalling is used for determining an indication mode of X bits in
a control information format, the indication mode of X bits comprises at least
one of the following: all of the X bits being used for indicating a first parameter
set of at least one enabled transmission block in control information, and the X
bits being used for indicating a first parameter set and a second parameter set of
at least one enabled transmission block in the control information, where X is a
positive integer greater than or equal to 3
```
⟶ S102

```
Generating a control information format according to the high-layer
configuration signalling
```
⟶ S104 that control information cannot support the processing of interference coordination of reference signals, so as to achieve the effect of being capable of supporting the interference coordination of reference signals among cells on the premise of ensuring the data throughput of the cells to improve the spectral efficiency of the system.

20 Claims, 3 Drawing Sheets

(56) References Cited

U.S. PATENT DOCUMENTS

| | | | |
|---|---|---|---|
| 2011/0281601 | A1 | 11/2011 | Ahn |
| 2011/0317643 | A1* | 12/2011 | Gaal .................. H04L 1/0029 370/329 |
| 2012/0282964 | A1* | 11/2012 | Xiao .................. H04B 7/024 455/515 |
| 2013/0039332 | A1* | 2/2013 | Nazar ................ H04B 7/0452 370/330 |

FOREIGN PATENT DOCUMENTS

| | | |
|---|---|---|
| CN | 102355292 A | 2/2012 |
| CN | 102387588 A | 3/2012 |
| CN | 102469473 A | 5/2012 |

OTHER PUBLICATIONS

Alcatel-Lucent et al, "Downlink Control Signaling for Comp", 3GPP Draft, vol. RAN WG1, May 12, 2012, XP050601060.

European Search Report for corresponding application EP13825356; dated Jun. 30, 2015.

Huawei, et al., "Consideration on DL and UL DCI for Comp", 3GPP Draft; R1-121952, 3rd Generation Partnership Project (3GPP), vol. RAN WG1, May 12, 2012, XP050600253.

Panasonic: "DCI for Rel-11 Comp Operations", 3GPP Draft; R1-121155, 3rd Generation Partnership Project (3GPP), vol. RAN WG1, Mar. 20, 2012, XP050599458.

* cited by examiner

CONTROL INFORMATION PROCESSING METHOD AND DEVICE

TECHNICAL FIELD

The disclosure relates to the field of communications, in particular to a control information processing method and device.

BACKGROUND

In the wireless communication technology, when a base station side (e.g., evolved NodeB, i.e., eNB) transmits data using a plurality of antennas, a spatial multiplexing mode may be employed to increase the data transmission rate, i.e., a transmitting end using the same time-frequency resource to transmit different data at different antenna positions, and a receiving end (e.g., user equipment (UE)) may also receive data using a plurality of antennas. Under a single-user scenario, all antenna resources are allocated to the same user, and the user exclusively occupies the physical resources allocated by the base station side during one transmission interval, this transmission mode is called Single User Multiple-Input Multiple-Output (SU-MIMO). Under a multi-user scenario, space resources of different antennas are allocated to different users, and a user and at least one another user share the physical resources allocated by the base station side during one transmission interval, the share mode being a space division multiple access mode or a space division multiplexing mode, this transmission mode is called Multiple User Multiple-Input Multiple-Output (MU-MIMO), where the physical resources allocated by the base station side refer to time-frequency resources. If a transmission system support both of SU-MIMO and MU-MIMO at the same time, the eNB needs to provide data related to these two modes to the UE. The UE under either SU-MIMO mode or MU-MIMO mode needs to acquire the rank that the eNB employs for transmission of MIMO data. In the SU-MIMO mode, all antenna resources are allocated to the same user, the number of layers used for transmission of MIMO data is equal to the rank that the eNB employs for transmission of MIMO data. In the MU-MIMO mode, the number of layers used for the transmission corresponding to one user is less than the total number of layers that the eNB employ for transmission of MIMO data. If the switching between the SU-MIMO mode and the MU-MIMO mode needs to be carried out, the eNB needs to notify the UE of different control data in different transmission modes.

Three downlink physical control channels are defined in Long-Term Evolution (LTE) Release 8: Physical Control Format Indicator Channel (PCFICH), Physical Hybrid Automatic Retransmission Request Indicator Channel (PHICH) and Physical Downlink Control Channel (PDCCH). PDCCH is used for carrying Downlink Control Information (DCI), including uplink and downlink scheduling information, and uplink power control information. The DCI format includes DCI format 0, DCI format 1, DCI format 1A, DCI format 1B, DCI format 1C, DCI format 1D, DCI format 2, DCI format 2A, DCI format 3, DCI format 3A. The transmission mode 5 supporting MU-MIMO uses downlink control information of DCI format 1D, and the downlink power offset field $\delta_{power\text{-}offset}$ in the DCI format 1D is used to indicate the information of reducing the power for one user by half (i.e., −10 log 10 (2)) in the MU-MIMO mode. Because the MU-MIMO transmission mode 5 only supports the MU-MIMO transmission of two users, through the downlink power offset field, the MU-MIMO transmission mode 5 may support dynamic switching between the SU-MIMO mode and the MU-MIMO mode. However, no matter in the SU-MIMO mode or in the MU-MIMO mode, this DCI format only supports transmission of one stream for one UE, although the transmission mode 4 in LTE Release 8 supports transmission of at most two streams for single-user, the LTE Release 8 cannot carry out dynamic switching of single-user multi-stream transmission and multi-user transmission, because the switching between transmission modes can only be semi-static.

In LTE Release 9, a transmission mode of double-stream beamforming is introduced for enhancing the downlink multi-antenna transmission, DCI format 2B is added for the downlink control information to support this transmission mode, the downlink control information processing method and device may have a scrambling identity (SCID) identifier bit to support two different scrambling sequences, and the eNB may allocate the two scrambling sequences to different users for multiplexing of the same resource for multiple users. In addition, when there is only one transmission block enabled, a new data indication (NDI) bit corresponding to a disabled transmission block is also used for indicating antenna ports in single-layer transmission.

In LTE Release 10, a transmission mode supporting dynamic switching between single-user MIMO and multi-user MIMO is introduced to support transmission of at least 8 layers, DCI format 2C is added for the downlink control information to support this transmission mode, and the downlink control information processing method and device may have a joint coding identifier bit of the scrambling identity, the antenna port, and the number of layers, wherein the 8 antenna ports can support at least 8 layers of single-user MIMO transmission, and the scrambling identity supports multi-user MIMO transmission.

In LTE Release 11, based on the transmission mode supporting dynamic switching between single-user MIMO and multi-user MIMO modes, a transmission mode of Coordinated Multi-point Transmission (COMP) is introduced, and the COMP technology is mainly used for increasing the cell edge throughput. The current downlink control information can only increase the cell edge data throughput, but cannot support the interference coordination of reference signals between cells (e.g., between a macro base station and a micro base station, and between a macro base station and another macro base station), such that if resource mapping is not carried out correctly according to the node selection, the reference signals will overlap the data resources to greatly interfere the data so as to affect the demodulation performance of the terminal and the spectral efficiency of the system.

Hence, there is a problem in the related art that control information cannot support the processing of interference coordination of reference signals.

SUMMARY

The embodiments of the disclosure provide a control information processing method and device to at least solve the problem in the related art that control information cannot support the processing of interference coordination of reference signals.

According to one embodiment of the disclosure, provided is a control information processing method, including: receiving high-layer configuration signalling, wherein the high-layer configuration signalling is used for determining an indication mode of X bits in a control information format, the indication mode of the X bits including at least one of the following: all of the X bits being used for indicating a first parameter set of at least one enabled transmission block in the control information, and the X bits being used for indicating a first parameter set and a second parameter set of at least one enabled transmission block in the control information, where X is a positive integer greater than or equal to 3; and generating a control information format according to the high-layer configuration signalling.

In the described embodiment, after generating the control information format, the method further includes: transmitting the generated control information format to user equipment (UE).

In the described embodiment, the indication mode of the X bits is: the X bits being used for indicating the first parameter set and the second parameter set of at least one enabled transmission block in the control information which includes: X1 bits in the X bits being used for indicating the first parameter set, and X2 bits in the X bits being used for indicating the second parameter set; or the X bits being used for indicating a combination constituted by the first parameter set and the second parameter set; where X=X1+X2, and each of X1 and X2 is a positive integer greater than or equal to 1.

In the described embodiment, the generating the control information format according to the high-layer configuration signalling includes: according to the high-layer configuration signalling, selecting from indication modes an indication mode of the X bits for generating the control information format; and generating the control information format according to the selected indication mode.

In the described embodiment, the first parameter set includes at least one of the following parameters: number of layers of cell signal transmission, scrambling identity, and antenna port.

In the described embodiment, the second parameter set includes at least one of the following parameters: cell identity, Multicast Broadcast-Single Frequency Network (MB-SFN) subframe configuration information, number of Common Reference Signal (CRS) ports, Channel State Information-Reference Symbol (CSI-RS) pattern, non-zero power CSI-RS pattern, and zero power CSI-RS pattern.

In the described embodiment, the second parameter set includes the following parameters: cell identity, Multicast Broadcast-Single Frequency Network (MB-SFN) subframe configuration information, and number of Common Reference Signal (CRS) ports.

In the described embodiment, the second parameter set includes the following parameters: cell identity, Multicast Broadcast-Single Frequency Network (MB-SFN) subframe configuration information, number of Common Reference Signal (CRS) ports, and Channel State Information-Reference Symbol (CSI-RS) pattern.

According to another embodiment of the disclosure, provided is a control information processing device, including: a receiving component configured to receive high-layer configuration signalling, wherein the high-layer configuration signalling is used for determining an indication mode of X bits in a control information format, the indication mode of the X bits including at least one of the following: all of the X bits being used for indicating a first parameter set of at least one enabled transmission block in the control information, and the X bits being used for indicating a first parameter set and a second parameter set of at least one enabled transmission block in the control information, where X is a positive integer greater than or equal to 3; and a generation component configured to generate a control information format according to the high-layer configuration signalling.

In the described embodiment, the device further includes: a transmitting component configured to transmit the generated control information format to user equipment (UE).

In the described embodiment, the indication mode of the X bits is the X bits being used for indicating the first parameter set and the second parameter set of at least one enabled transmission block in the control information which includes: X1 bits in the X bits being used for indicating the first parameter set, and X2 bits in the X bits being used for indicating the second parameter set; or the X bits being used for indicating a combination constituted by the first parameter set and the second parameter set; where X=X1+X2, and each of X1 and X2 is a positive integer greater than or equal to 1.

In the described embodiment, the generation component includes: a selection unit configured to, according to the high-layer configuration signalling, select from indication modes an indication mode of the X bits for generating the control information format; and a generation unit configured to generate the control information format according to the selected indication mode.

In the described embodiment, the first parameter set includes at least one of the following parameters: number of layers of cell signal transmission, scrambling identity, and antenna port.

In the described embodiment, the second parameter set includes at least one of the following parameters: cell identity, Multicast Broadcast-Single Frequency Network (MB-SFN) subframe configuration information, number of Common Reference Signal (CRS) ports, Channel State Information-Reference Symbol (CSI-RS) pattern, non-zero power CSI-RS pattern, and zero power CSI-RS pattern.

In the described embodiment, the second parameter set includes the following parameters: cell identity, Multicast Broadcast-Single Frequency Network (MB-SFN) subframe configuration information, and number of Common Reference Signal (CRS) ports.

In the described embodiment, the second parameter set includes the following parameters: cell identity, Multicast Broadcast-Single Frequency Network (MB-SFN) subframe configuration information, number of Common Reference Signal (CRS) ports, and Channel State Information-Reference Symbol (CSI-RS) pattern.

By the embodiments of the disclosure, a high-layer configuration signaling is received, wherein the high-layer configuration signalling is used for determining an indication mode of X bits in a control information format, the indication mode of X bits including at least one of the following: all of the X bits being used for indicating a first parameter set of at least one enabled transmission block in the control information, and the X bits being used for indicating a first parameter set and a second parameter set of at least one enabled transmission block in the control information, where X is a positive integer greater than or equal to 3; and a control information format is generated according to the high-layer configuration signalling. The embodiments of the disclosure can solve the problem in the related art that control information cannot support the processing of interference coordination of reference signals, such that the system may carry out resource mapping correctly according to the node selection to avoid the interference due to the overlapping of reference signals and data resources, so as to achieve the effect of supporting the interference coordination of reference signals among cells on the premise of ensuring the data throughput of the cells while employing the transmission technology of Coordinated Multi-point Transmission (COMP), thereby improving the spectral efficiency of the system.

DESCRIPTION OF THE DRAWINGS

Drawings, provided for further understanding of the disclosure and forming a part of the specification, are used to explain the disclosure together with embodiments of the disclosure rather than to limit the disclosure. In the drawings.

DETAILED DESCRIPTION OF THE EMBODIMENTS

The disclosure is described below in detail by reference to the accompanying drawings in conjunction with embodiments. It should be noted that the embodiments and the characteristics of the embodiments can be combined with each other if no conflict is caused.

Figure 1:
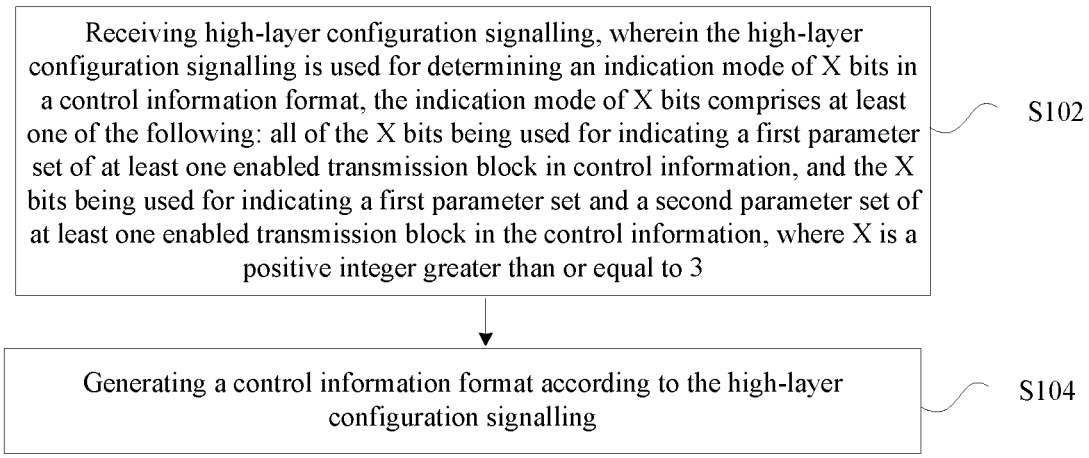
FIG. 1 shows a flowchart of a control information processing method according to an embodiment of the disclosure.

In this embodiment, provided is a control information processing method. FIG. 1 shows a flowchart of a control information processing method according to an embodiment of the disclosure. As shown in FIG. 1, the flow includes the following steps.

Step S102, high-layer configuration signaling is received, wherein the high-layer configuration signalling is used for determining an indication mode of X bits in a control information format, the indication mode of X bits includes at least one of the following: all of the X bits being used for indicating a first parameter set of at least one enabled transmission block in the control information, and the X bits being used for indicating a first parameter set and a second parameter set of at least one enabled transmission block in the control information (the first parameter set being used for controlling signal transmission of cells, and the second parameter set being used for controlling interference coordination of reference signals among cells), where X is a positive integer greater than or equal to 3.

Step S104, a control information format is generated according to the high-layer configuration signalling.

By the above-mentioned steps, the indication mode of X bits in the control information format is determined according to the high-layer configuration signalling. Compared with the manner that all of the X bits are used for indicating the first parameter set adopted in the related art, which results in the problem of being not capable of supporting the interference coordination of reference signals among cells, the X bits in the control information format include one or more bit for indicating the second parameter set, which not only solves the problem in the related art of being not capable of supporting the interference coordination of reference signals among cells, but also improves the spectral efficiency of the system to a certain extent.

After the control information format is generated, the above-mentioned generated control information format may further be transmitted to user equipment (UE). The transmission may be carried out in a plurality of modes, for example, the generated control information formats may be transmitted to the UE through a physical control channel including a general physical control channel and an enhanced physical control channel. The transmission may also be carried out in other modes, and all modes capable of transmitting the above-mentioned control information format to the UE may be applied to the embodiments of the disclosure.

The above-mentioned indication mode of the X bits may be the X bits being used for indicating the first parameter set and the second parameter set of at least one enabled transmission block in the control information. There may be multiple modes to implement this indication mode, for example, X1 bits in the X bits are used for indicating the first parameter set, and X2 bits in the X bits are used for indicating the second parameter set; and for another example, X bits are used for indicating a combination of a first parameter set and a second parameter set, where X=X1+X2, and each of X1 and X2 is a positive integer greater than or equal to 1. No matter which processing mode is used, identification of the first parameter set and the second parameter set can be implemented, and which indication mode shall be used may be flexibly selected according to specific conditions.

The control information format may be generated according to the high-layer configuration signalling by the manner described as follows: according to the high-layer configuration signalling, selecting from multiple indication modes an indication mode of X bits for generating the control information format; and generating the control information format according to the selected indication mode. It should be noted that the above-mentioned first parameter set includes at least one of the following parameters: number of layers of cell signal transmission, scrambling identity, and antenna port.

The above-mentioned second parameter set includes at least one of the following parameters: cell identity, Multicast Broadcast-Single Frequency Network (MB-SFN) subframe configuration information, number of CRS ports, Channel State Information-Reference Symbol (CSI-RS) pattern, non-zero power CSI-RS pattern, and zero power CSI-RS pattern. The above-mentioned parameters may be flexibly combined for constituting the first parameter set and the second parameter set. For example, when constituting the first parameter set, in an example embodiment, two or all three parameters therein may be selected; and when constituting the second parameter set, in an example embodiment, three or more parameters therein may be selected. For example, the above-mentioned second parameter set includes the following parameters: cell identity, Multicast Broadcast-Single Frequency Network (MB-SFN) subframe configuration information, and number of CRS ports. For another example, the above-mentioned second parameter set may also include the following parameters: cell identity, Multicast Broadcast-Single Frequency Network (MB-SFN) subframe configuration information, number of CRS ports, and Channel State Information-Reference Symbol (CSI-RS) pattern.

In this embodiment, also provided is a control information processing device for implementing the above-mentioned embodiments and example embodiments, what have been described will not be repeated here. As used below, the term "component" is a combination of software and/or hardware capable of implementing predetermined functions. Although the device described in the following embodiments may be preferably implemented by software, it would be conceived to implement the device by hardware or a combination of software and hardware.

Figure 2:
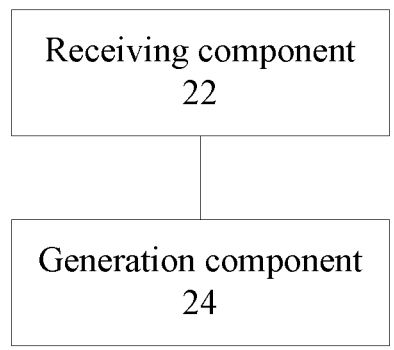
FIG. 2 shows a structure diagram of a control information processing device according to an embodiment of the disclosure.

FIG. 2 shows a structure diagram of a control information processing device according to an embodiment of the disclosure. As shown in FIG. 2, the device includes a receiving component 22 and a generation component 24. The device is described below.

The receiving component 22 is configured to receive high-layer configuration signalling, wherein the high-layer configuration signalling is used for determining an indication mode of X bits in a control information format, the indication mode of X bits including at least one of the following: all of the X bits being used for indicating a first parameter set of at least one enabled transmission block in the control information, and the X bits being used for indicating the first parameter set and the second parameter set of at least one enabled transmission block in the control information, where X is a positive integer greater than or equal to 3; and the generation component 24 is coupled to the above-mentioned receiving component 22, and configured to generate a control information format according to the above-mentioned high-layer configuration signalling.

Figure 3:
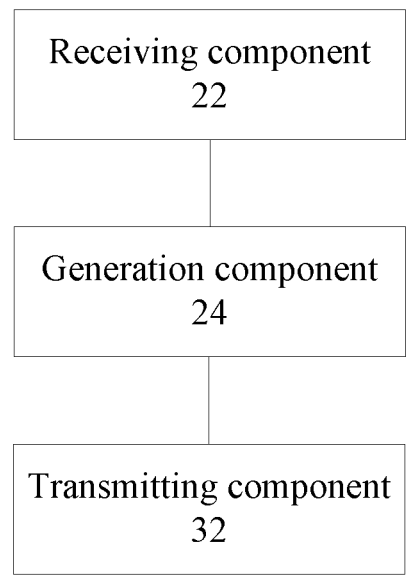
FIG. 3 shows an example structure diagram of a control information processing device according to an embodiment of the disclosure.

FIG. 3 shows an example structure diagram of a control information processing device according to an embodiment of the disclosure. As shown in FIG. 3, except all the components shown in FIG. 2, the device also includes a transmitting component 32. The above-mentioned transmitting component 32 is described below.

The transmitting component 32 is coupled to the above-mentioned generation component 24, and configured to transmit the generated control information format to user equipment (UE).

In the example embodiment, the indication mode of the X bits may be: the X bits being used for indicating the first parameter set and the second parameter set of at least one enabled transmission block in the control information, including: X1 bits in the X bits being used for indicating the first parameter set, and X2 bits in the X bits being used for indicating the second parameter set; or the X bits being used for indicating a combination of the first parameter set and the second parameter set, where X=X1+X2, and each of X1 and X2 is a positive integer greater than or equal to 1.

Figure 4:
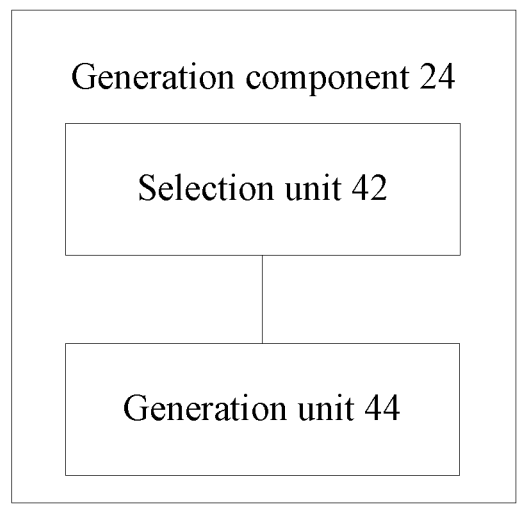
FIG. 4 shows an example structure diagram of a generation component 32 in a control information processing device according to an embodiment of the disclosure.

FIG. 4 shows an example structure diagram of a generation component 32 in a control information processing device according to an embodiment of the disclosure. As shown in FIG. 4, the generation component 32 includes a selection unit 42 and a generation unit 44. The generation component 32 is described below.

The selection unit 42 is configured to, according to the above-mentioned high-layer configuration signalling, selecting from multiple indication modes an indication mode of X bits for generating a control information format; and the generation unit 44 is coupled to the above-mentioned selection unit 42, and configured to generate a control information format according to the selected indication mode.

In the example embodiment, the above-mentioned first parameter set may include at least one of the following parameters: number of layers of cell signal transmission, scrambling identity, and antenna port. The above-mentioned second parameter set may include at least one of the following parameters: cell identity, Multicast Broadcast-Single Frequency Network (MB-SFN) subframe configuration information, number of CRS ports, Channel State Information-Reference Symbol (CSI-RS) pattern, non-zero power CSI-RS pattern, and zero power CSI-RS pattern. For example, the above-mentioned second parameter set includes the following parameters: cell identity, Multicast Broadcast-Single Frequency Network (MB-SFN) subframe configuration information, and number of CRS ports. For another example, the above-mentioned second parameter set includes the following parameters: cell identity, Multicast Broadcast-Single Frequency Network (MB-SFN) subframe configuration information, number of CRS ports, and Channel State Information-Reference Symbol (CSI-RS) pattern.

Aiming at the problem in the related art that downlink control information cannot support the interference coordination of reference signals among cells, this embodiment provides a downlink control signalling processing method and device (also called a control information processing method and device), and this method supports multi-layer transmission. By this method, the downlink control information is capable of supporting the interference coordination of the reference signals among cells on the premise of not increasing the cost of current downlink control information and being compatible with the current downlink control information.

The downlink control signalling processing method provided by this embodiment includes: a base station (eNodeB) generating a downlink control information format, wherein in the Multiple-Input Multiple-Output (MIMO) data transmission, according to high-layer configuration signalling, the above-mentioned downlink control information format uses x bits to indicate the joint coding of different first parameter sets when the numbers of enabled transmission blocks are different and to indicate different second parameter sets in two second parameter sets defined by high-layer configuration signalling, where x is a positive integer greater than or equal to 3. The base station transmits the above-mentioned downlink control information format to user equipment (UE) through a physical control channel. The above-mentioned high-layer configuration indication signalling is used for selecting different indication methods for the x bits of the two types of downlink control signalling. Different indication methods may be in different forms.

For example, the first indication mode is that the x bits only indicate the joint coding of different first parameter sets when there are different number of transmission blocks; and the second indication mode is that the x bits include x1 bits and x2 bits, the x1 bits being used for indicating the joint coding of different first parameter sets when there are different number of transmission blocks, the x2 bits being used for selecting one second parameter set from $2^{x2}$ second parameter sets which are defined by high-layer configuration signalling, where x=x1+x2, each of x1 and x2 is a positive integer greater than or equal to 1.

For another example, the first indication mode is: the x bits being only used for indicating joint coding of different first parameter sets when there are different number of transmission blocks; and the second indication mode is: the x bits including $2^x$ states, $2^{x1}$ states of the $2^x$ states being used for indicating joint coding of different first parameter sets when there are different number of transmission blocks, $2^{x2}$ states of the $2^x$ states being used for selecting one second parameter set from $2^{x2}$ second parameter sets which are defined by high-layer configuration signalling, where x=x1+x2, each of x1 and x2 is a positive integer greater than or equal to 1.

In the example embodiment, when the joint coding of the first parameter set corresponds to a single or two transmission blocks enabled, the joint coding indicating joint coding for two or three of the following information: number of transmission layers, scrambling identity, and antenna port. The second parameter set includes at least one of the following parameters: cell identity (Cell-ID), number of CRS ports, and MB-SFN subframe configuration information.

The second parameter set includes CRS pattern, number of transmitting antennae (number of CRS ports), MB-SFN subframe configuration information, and CSI-RS pattern. For another example, the second parameter set includes CRS pattern, number of transmitting antennae (number of CRS ports), MB-SFN subframe configuration information, non-zero power CSI-RS pattern, and zero power CSI-RS bitmap.

This embodiment also provides a downlink control signalling processing device applied to an evolved NodeB. The downlink control signalling processing device includes a downlink control information format generation component (functionally equivalent to the above-mentioned generation component) and a downlink control information transmitting component (functionally equivalent to the above-mentioned transmitting component). The downlink control information format generation component is configured to generate a downlink control information format, and in the Multiple-Input Multiple-Output (MIMO) data transmission, according to high-layer configuration signalling, use x bits in the above-mentioned downlink control information format to indicate joint coding of different first parameter sets when there are different number of enabled transmission blocks and to indicate different second parameter sets, where x is a positive integer greater than 1. The downlink control information transmitting component is configured to transmit the downlink control information format to the user equipment (UE) through a physical control channel. The high-layer configuration signalling is used for selecting different indication methods for the x bits of the two types of downlink control signalling.

For example, the first indication mode is that the x bits only indicate the joint coding of different first parameter sets when there are different number of transmission blocks; and the second indication mode is that the x bits include x1 bits and x2 bits, the x1 bits being used for indicating the joint coding of different first parameter sets when there are different number of transmission blocks, the x2 bits being used for selecting one second parameter set from $2^{x2}$ second parameter sets which are defined by high-layer configuration signalling, where x=x1+x2, each of x1 and x2 is a positive integer greater than or equal to 1.

For another example, the first indication mode is: the x bits being only used for indicating joint coding of different first parameter sets when there are different number of transmission blocks; and the second indication mode is: the x bits including $2^x$ states, the $2^{x1}$ states being used for indicating joint coding of different first parameter sets when there are different number of transmission blocks, the $2^{x2}$ states being used for selecting one second parameter set from the $2^{x2}$ second parameter sets which are defined by high-layer configuration signalling, where x=x1+x2, each of x1 and x2 is a positive integer greater than or equal to 1.

In the example embodiment, when the joint coding of the first parameter set corresponds to a single or two transmission blocks enabled, the joint coding refers to the joint coding for at least one of the following information: number of transmission layers, scrambling identity, and antenna port. The second parameter set includes at least one of the following parameters: cell identity (Cell-ID), number of CRS ports, and MB-SFN subframe configuration information. The second parameter set includes CRS pattern, number of transmitting antennae (number of CRS ports), MB-SFN subframe configuration information, and CSI-RS pattern; and for another example, the second parameter set includes CRS pattern, number of transmitting antennae (number of CRS ports), MB-SFN sub frame configuration information, non-zero power CSI-RS pattern, and zero power CSI-RS bitmap.

By the above-mentioned embodiments and example embodiments, through the above-mentioned downlink control signalling, joint coding of different first parameter sets and parameters of different second type cells are indicated during Multiple-Input Multiple-Output (MIMO) data transmission, thereby effectively supporting interference coordination of different reference signals among cells in coordinated multi-point transmission.

The above-mentioned embodiments and example embodiments provide a downlink control information processing method and device. Upon considering the problem in the related art that the LTE Release 10 does not support the interference coordination of multiple reference signals among cells, an embodiment of the disclosure provides a downlink control information processing method and device, using an indication signalling in the downlink control information format to indicate the joint coding of different first parameter sets when there are different number of enabled transmission blocks and different second parameter sets, wherein the second parameter set mainly includes reference signal parameters for implementing coordinated multi-point transmission. In addition, the same signalling may support single-user MIMO transmission and multi-user MIMO transmission with eight transmission layers at maximum, and coordinated multi-point (COMP) transmission simultaneously. Therefore, the solution can effectively support the interference coordination of the reference signals among cells and effectively improve the spectral efficiency of the system on the premise of not increasing the cost of current downlink control information and being compatible with the current downlink control information.

Figure 5:
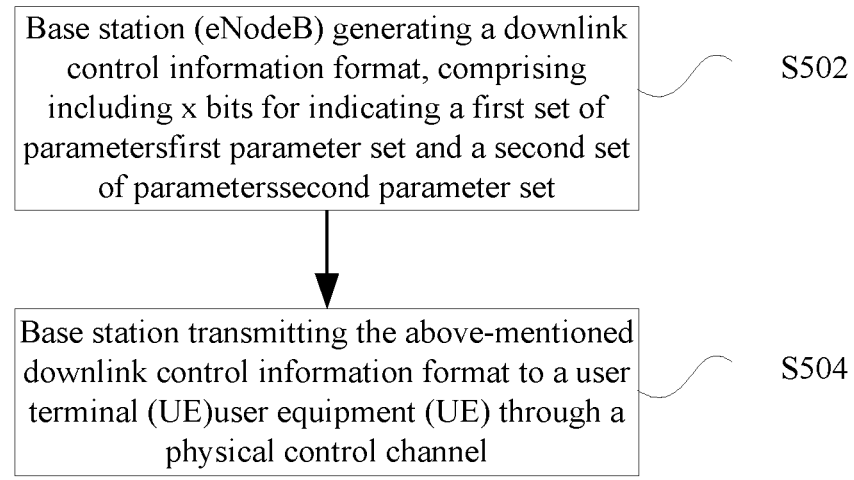
FIG. 5 shows a flowchart of a downlink control signalling processing method according to an embodiment of the disclosure.

FIG. 5 shows a flowchart of a downlink control signalling processing method according to an embodiment of the disclosure. As shown in FIG. 5, the process includes the following steps.

Step S502, a base station (eNodeB) generates a downlink control information format, wherein in the Multiple-Input Multiple-Output (MIMO) data transmission, according to high-layer configuration signalling, the downlink control information format uses x bits to indicate the joint coding of different first parameter sets when the numbers of enabled transmission blocks are different and to indicate different second parameter sets in two second parameter sets defined by high-layer configuration signalling, where X is a positive integer greater than or equal to 3.

Step S504, the base station transmits the above-mentioned downlink control information format to user equipment (UE) through a physical control channel.

In the example embodiment, when the joint coding of the first parameter set corresponds to a single or two transmission blocks enabled, the joint coding refers to joint coding for two or three of the following information: number of transmission layers, scrambling identity, and antenna port. The second parameter set includes at least one of the following parameters: cell identity, number of transmitting antennae (number of CRS ports), MB-SFN sub frame configuration information, cell identity, CSI-RS pattern, and non-zero power CSI-RS bitmap.

For example, the second parameter set includes cell identity, number of CRS ports, and MB-SFN subframe configuration information. For another example, the second parameter set includes cell identity, number of transmitting antennae (number of CRS ports), MB-SFN subframe configuration information, and CSI-RS pattern. For still another example, the second parameter set includes cell identity, number of transmitting antennae (number of CRS ports), MB-SFN subframe configuration information, non-zero power CSI-RS pattern, and zero power CSI-RS pattern.

It should be noted that the above-mentioned pilot information may include pilot pattern and/or pilot mode. Pilot pattern is equivalent to pilot mode. A pilot pattern corresponds to only one pilot mode, and a pilot pattern may be determined by the corresponding pilot mode.

Figure 6:
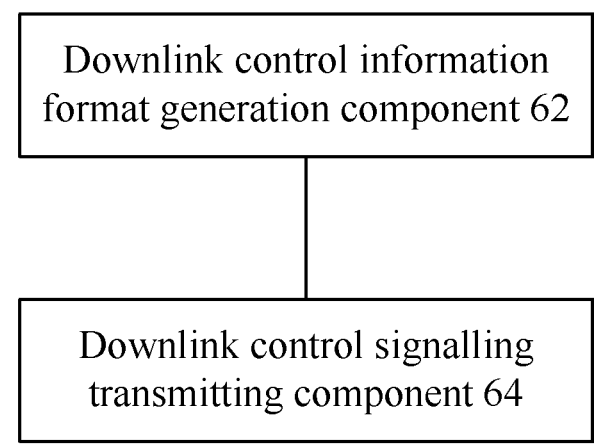
FIG. 6 shows a structure diagram of a downlink control signalling processing device according to an embodiment of the disclosure.

FIG. 6 shows a structure diagram of a downlink control signalling processing device according to an embodiment of the disclosure. As shown in FIG. 6, the device is applied to evolved NodeB, and includes a downlink control information format generation component 62 and a downlink control signalling transmitting component 64. The downlink control information format generation component 62 is configured to generate a downlink control information format, and in the Multiple-Input Multiple-Output (MIMO) data transmission, according to high-layer configuration signalling, use x bits in the above-mentioned downlink control information format to indicate joint coding of different first parameter sets when there are different number of enabled transmission blocks and to indicate different second parameter sets, where x is a positive integer greater than or equal to 3. The downlink control signalling transmitting component 64 is configured to transmit the downlink control information format to the user equipment (UE) through a physical control channel.

In the example embodiment, the high-layer configuration signalling includes a first high-layer configuration indication signalling used for selecting different indication methods for the x bits of the two types of downlink control signalling.

For example, the first indication mode is that the x bits only indicate the joint coding of different first parameter sets when there are different number of transmission blocks; and the second indication mode is that the x bits include x1 bits and x2 bits, the x1 bits being used for indicating the joint coding of different first parameter sets when there are different number of transmission blocks, the x2 bits being used for selecting one second parameter set from $2^{x2}$ second parameter sets which are defined by high-layer configuration signalling, where x=x1+x2, each of x1 and x2 is a positive integer greater than 1.

For another example, the first indication mode is: the x bits being only used for indicating joint coding of different first parameter sets when there are different number of transmission blocks; and the second indication mode is: the x bits including $2^x$ states, $2^{x1}$ states of the $2^x$ states being used for indicating joint coding of different first parameter sets when there are different number of transmission blocks, $2^{x2}$ states of the $2^x$ states being used for selecting one second parameter set from the $2^{x2}$ second parameter sets which are defined by high-layer configuration signalling, where x=x1+x2, each of x1 and x2 is a positive integer greater than 1.

In the example embodiment, when the joint coding of the first parameter set corresponds to a single or two transmission blocks enabled, the joint coding refers to joint coding for two or three of the following information: number of transmission layers, scrambling identity, and antenna port. The second parameter set at least includes one or more of the following parameters: cell identity, number of transmitting antennae (number of CRS ports), MB-SFN subframe configuration information, cell identity, CSI-RS pattern, and non-zero power CSI-RS bitmap.

For example, the second parameter set includes cell identity, number of CRS ports, and MB-SFN subframe configuration information. For another example, the second parameter set includes cell identity, number of transmitting antennae (number of CRS ports), MB-SFN subframe configuration information, and CSI-RS pattern. For still another example, the second parameter set includes cell identity, number of transmitting antennae (number of CRS ports), MB-SFN subframe configuration information, non-zero power CSI-RS pattern, and zero power CSI-RS pattern.

The embodiments of the disclosure are described below in conjunction with specific embodiments.

It should be noted that the corresponding relationship in the following embodiments and example embodiments (for example, the corresponding relationship between the index after joint coding and the specific property, the corresponding relationship between the antenna port and the number of layers, and the corresponding relationship between the index of layers and the pilot pattern in the tables) is not defined as the only corresponding relationship, i.e., they may be exchanged and combined arbitrarily in order, just in one-to-one correspondence. Specifically, an index after joint coding corresponds to an only specific property, and a specific property corresponds to an only index after joint coding. A possible correspondence is listed in the following embodiments and example embodiments, but it should be noted that other forms of correspondence, as long as the states of the specific property are identical, should be contained in the protection scope of the disclosure.

Embodiment I

This embodiment provides a downlink control signalling processing method. A base station (eNodeB) generates a downlink control information format, wherein in the Multiple-Input Multiple-Output (MIMO) data transmission, according to high-layer configuration signalling, x=3 bits in the downlink control information format are used for indicating the joint coding of different first parameter sets when the number of enabled transmission blocks is 1 or 2, and indicating different second parameter sets in two second parameter sets defined by high-layer configuration signalling. The base station transmits the above-mentioned downlink control information format to user equipment (UE) through a physical control channel PDCCH and/or ePDCCH.

In the example embodiment, the above-mentioned high-layer configuration signalling is used for selecting different indication methods for the x bits in the two types of downlink control signalling. For example, when the high-layer configuration signalling is 0, a first mode A is selected, and when the high-layer configuration signalling is 1, a second mode B is selected. Alternatively, when there is high-layer configuration signalling, the first mode A is selected, and when there is no high-layer configuration signalling, the second mode B is selected.

The first mode A and second mode B mentioned above are described below separately.

For the first indication mode A, x=3 bits only indicate the joint coding of the first parameter sets when the number of transmission blocks is 1 or 2. Table 1 is a table showing the joint coding of the first parameter sets for at least eight-layer transmission supported by the x bits according to an embodiment of the disclosure, as shown in Table 1:

TABLE 1

| Value | Information |
| --- | --- |
| | One code word: |
| | Code word 0 enabled, |
| | Code word 1 disabled |
| 0 | Layer 1, port 7, $n_{SCID}$ = 0 |
| 1 | Layer 1, port 7, $n_{SCID}$ = 1 |
| 2 | Layer 1, port 8, $n_{SCID}$ = 0 |
| 3 | Layer 1, port 8, $n_{SCID}$ = 1 |
| 4 | Layer 2, ports 7-8 |
| 5 | Layer 3, ports 7-9 |
| 6 | Layer 4, ports 7-10 |
| 7 | Reserved |
| | Two code words: |
| | Code word 0 enabled, |
| | Code word 1 enabled |
| 0 | Layer 2, ports 7-8, $n_{SCID}$ = 0 |
| 1 | Layer 2, ports 7-8, $n_{SCID}$ = 1 |
| 2 | Layer 3, ports 7-9 |
| 3 | Layer 4, ports 7-10 |
| 4 | Layer 5, ports 7-11 |
| 5 | Layer 6, ports 7-12 |
| 6 | Layer 7, ports 7-13 |
| 7 | Layer 8, ports 7-14 |

For the second indication mode B, x=3 bits include x1=2 bits and x2=1 bit. Table 2 is a joint coding table for at least four transmission layers supported by x1=2 bits according to an embodiment of the disclosure. As shown in Table 2, x1=2 bits are used for indicating the joint coding of different first parameter sets when the number of transmission blocks is 1 or 2. Table 3 is a joint coding table for at least four transmission layers supported by x2=1 bit according to an embodiment of the disclosure. As shown in Table 3, x2=1 bit is used for selecting one second parameter set from two second parameter sets defined by high-layer configuration signalling.

TABLE 2

| Value | Information |
| --- | --- |
| | One code word: |
| | Code word 0 enabled, |
| | Code word 1 disabled |
| 0 | Layer 1, port 7, $n_{SCID}$ = 0 |
| 1 | Layer 1, port 7, $n_{SCID}$ = 1 |
| 2 | Layer 1, port 8, $n_{SCID}$ = 0 |
| 3 | Layer 1, port 8, $n_{SCID}$ = 1 |
| | Two code words: |
| | Code word 0 enabled, |
| | Code word 1 enabled |
| 0 | Layer 2, ports 7-8, $n_{SCID}$ = 0 |
| 1 | Layer 2, ports 7-8, $n_{SCID}$ = 1 |
| 2 | Layer 3, ports 7-9 |
| 3 | Layer 4, ports 7-10 |

TABLE 3

| Value | Information |
| --- | --- |
| 0 | The first of the two high-layer defined second parameter sets |
| 1 | The second of the two high-layer defined second parameter sets |

In the above-mentioned Table 1 and Table 2, the joint coding of the first parameter set corresponding to a single or two transmission blocks enabled refers to the joint coding of two or three of the following information. In the joint coding of three types of information, the first parameter set includes: number of transmission layers, scrambling identity, and antenna port; and in the joint coding of two types of information, the first parameter set includes: number of transmission layers, and antenna port.

In the Table 3, the second parameter set at least includes one or more of the following parameters: cell identity, number of transmitting antennae (number of CRS ports), MB-SFN subframe configuration information, CSI-RS pattern, and non-zero power CSI-RS bitmap.

For example, the above-mentioned second parameter set includes cell identity, number of CRS ports, and MB-SFN subframe configuration information. For another example, the above-mentioned second parameter set includes cell identity, number of transmitting antennae (number of CRS ports), MB-SFN subframe configuration information, and CSI-RS pattern. For still another example, the above-mentioned second parameter set includes cell identity, number of transmitting antennae (number of CRS ports), MB-SFN subframe configuration information, non-zero power CSI-RS pattern, and zero power CSI-RS pattern.

Embodiment II

This embodiment provides a downlink control signalling processing method. A base station (eNodeB) generates a downlink control information format, wherein in the Multiple-Input Multiple-Output (MIMO) data transmission, according to high-layer configuration signalling, x=3 bits in the downlink control information format are used for indicating the joint coding of different first parameter sets when the number of enabled transmission blocks is 1 or 2, and indicating different second parameter sets in two second parameter sets defined by high-layer configuration signalling. The base station transmits the above-mentioned downlink control information format to user equipment (UE) through a physical control channel PDCCH or ePDCCH.

Similarly, the above-mentioned high-layer configuration signalling is used for selecting different indication methods for the x bits in the two types of downlink control signalling. For example, when the high-layer configuration signalling is 0, a first mode A is selected, and when the high-layer configuration signalling is 1, a second mode B is selected. Alternatively, when there is the above-mentioned high-layer configuration signalling, the first mode A is selected, and when there is no the above-mentioned high-layer configuration signalling, the second mode B is selected.

The first mode A and second mode B mentioned above are described below separately.

For the first indication mode A, as shown in Table 1, x=3 bits only indicate the joint coding of different first parameter sets when the number of transmission blocks is 1 or 2. For the second indication mode B, x=3 bits include eight states. Table 4 is a joint coding table of the first parameter set and the second parameter set for at least eight transmission layers supported by the x bits according to an embodiment of the disclosure. As shown in Table 4, x=3 bits are used for indicating the joint coding of the selected information of different first parameter sets and second parameter sets when the number of transmission blocks is 1 or 2.

TABLE 4

| Value | Information |
|---|---|
| | One code word: Code word 0 enabled, Code word 1 disabled |
| 0 | Layer 1, port 7, $n_{SCID}$ = 0, the first of the two high-layer defined second parameter sets |
| 1 | Layer 1, port 7, $n_{SCID}$ = 1, the first of the two high-layer defined second parameter sets |
| 2 | Layer 1, port 8, $n_{SCID}$ = 0, the first of the two high-layer defined second parameter sets |
| 3 | Layer 1, port 8, $n_{SCID}$ = 1, the first of the two high-layer defined second parameter sets |
| 4 | Layer 1, port 7, $n_{SCID}$ = 0, the second of the two high-layer defined second parameter sets |
| 5 | Layer 1, port 7, $n_{SCID}$ = 1, the second of the two high-layer defined second parameter sets |
| 6 | Layer 1, port 8, $n_{SCID}$ = 0, the second of the two high-layer defined second parameter sets |
| 7 | Layer 1, port 8, $n_{SCID}$ = 1, the second of the two high-layer defined second parameter sets |
| | Two code words: Code word 0 enabled, Code word 1 enabled |
| 0 | Layer 2, ports 7-8, $n_{SCID}$ = 0, The first of the two high-layer defined second parameter sets |
| 1 | Layer 2, ports 7-8, $n_{SCID}$ = 1, The first of the two high-layer defined second parameter sets |
| 2 | Layer 3, ports 7-9, the first of the two high-layer defined second parameter sets |
| 3 | Layer 4, port 7-10, the first of the two high-layer defined second parameter sets |
| 4 | Layer 2, ports 7-8, $n_{SCID}$ = 0, the second of the two high-layer defined second parameter sets |
| 5 | Layer 2, ports 7-8, $n_{SCID}$ = 1, the second of the two high-layer defined second parameter sets |
| 6 | Layer 3, ports 7-9, the second of the two high-layer defined second parameter sets |
| 7 | Layer 4, ports 7-10, the second of the two high-layer defined second parameter sets |

In the above-mentioned Table 1, the joint coding of the first parameter set corresponding to a single or two transmission blocks enabled refers to the joint coding of two or three of the following information. In the joint coding of three types of information, the first parameter set includes: number of transmission layers, scrambling identity, and antenna port; and in the joint coding of two types of information, the first parameter set includes: number of transmission layers, and antenna port.

In the above-mentioned Table 4, the second parameter set at least includes one or more of the following parameters: cell identity, number of transmitting antennae (number of CRS ports), MB-SFN subframe configuration information, CSI-RS pattern, and non-zero power CSI-RS bitmap.

For example, the second parameter set includes cell identity, number of CRS ports, and MB-SFN subframe configuration information. For another example, the second parameter set includes cell identity, number of transmitting antennae (number of CRS ports), MB-SFN subframe configuration information, and CSI-RS pattern. For still another example, the second parameter set includes cell identity, number of transmitting antennae (number of CRS ports), MB-SFN subframe configuration information, non-zero power CSI-RS pattern, and zero power CSI-RS pattern.

Embodiment III

This embodiment provides a downlink control signalling processing device applied to evolved NodeB. The downlink control signalling processing device includes a downlink control information format generation component and a downlink control signalling transmitting component. The downlink control information format generation component is configured to generate a downlink control information format, and in the Multiple-Input Multiple-Output (MIMO) data transmission, according to high-layer configuration signalling, use x bits in the above-mentioned downlink control information format for indicating joint coding of different first parameter sets when there are different number of enabled transmission blocks and indicating different second parameter sets, where x is a positive integer greater than or equal to 3. The downlink control signalling transmitting component is configured to transmit the downlink control information format to user equipment (UE) through a physical control channel.

In the example embodiment, the above-mentioned high-layer configuration signalling is used for selecting different indication methods for the x bits in the two types of downlink control signalling. For example, when the high-layer configuration signalling is 0, a first mode A is selected, and when the high-layer configuration signalling is 1, a second mode B is selected. Alternatively, when there is the high-layer configuration signalling, the first mode A is selected, and when there is no the high-layer configuration signalling, the second mode B is selected.

For the first indication mode A, x=3 bits only indicate the joint coding of the first parameter sets when the number of transmission blocks is 1 or 2, as shown in the above-mentioned Table 1.

For the second indication mode B, x=3 bits include x1=2 bits and x2=1 bit. As shown in the above-mentioned Table 2, x1=2 bits are used for indicating the joint coding of the different first parameter sets when the number of transmission blocks is 1 or 2. As shown in the above-mentioned Table 3, x2=1 bit is used for selecting one second parameter set from the two second parameter sets, and the high-layer configuration signalling defines the two second parameter sets.

In the above-mentioned Table 1 and Table 2, the joint coding of the first parameter sets corresponding to a single or two transmission blocks enabled refers to the joint coding of two or three of the following information. In the joint coding of three types of information, the first parameter set includes number of transmission layers, scrambling identity, and antenna port; and in the joint coding of two types of information, the first parameter set includes number of transmission layers, and antenna port.

In the above-mentioned Table 3, the second parameter set at least includes one or more of the following parameters: cell identity, number of transmitting antennae (number of CRS ports), MB-SFN subframe configuration information, CSI-RS pattern, and non-zero power CSI-RS bitmap.

For example, the second parameter set includes cell identity, number of CRS ports, and MB-SFN subframe configuration information. For another example, the second parameter set includes cell identity, number of transmitting antennae (number of CRS ports), MB-SFN subframe configuration information, and CSI-RS pattern. For still another example, the second parameter set includes cell identity, number of transmitting antennae (number of CRS ports), MB-SFN subframe configuration information, non-zero power CSI-RS pattern, and zero power CSI-RS pattern.

Embodiment IV

This embodiment also provides a downlink control signalling processing device applied to evolved NodeB. The downlink control signalling processing device includes a downlink control information format generation component and a downlink control signalling transmitting component. The downlink control information format generation component is configured to generate a downlink control information format, and in the Multiple-Input Multiple-Output (MIMO) data transmission, according to high-layer configuration signalling, use x bits in the above-mentioned downlink control information format for indicating joint coding of different first parameter sets when there are different number of enabled transmission blocks and indicating different second parameter sets, where x is a positive integer greater than or equal to 3. The downlink control signalling transmitting component is configured to transmit the downlink control information format to user equipment (UE) through a physical control channel.

In the example embodiment, the above-mentioned high-layer configuration signalling is used for selecting different indication methods for the x bits in the two types of downlink control signalling. For example, when the above-mentioned high-layer configuration signalling is 0, a first mode A is selected, and when the high-layer configuration signalling is 1, a second mode B is selected. Alternatively, when there is the above-mentioned high-layer configuration signalling, the first mode A is selected, and when there is no the above-mentioned high-layer configuration signalling, the second mode B is selected.

For the first indication mode A, as shown in the above-mentioned Table 1, x=3 bits only indicate the joint coding of the different first parameter sets when the number of transmission blocks is 1 or 2. For the second indication mode B, x=3 bits include eight states, and as shown in the above-mentioned Table 4, are used for indicating the joint coding of the selected information of the different first parameter sets and second parameter sets when the number of transmission blocks is 1 or 2.

In the above-mentioned Table 1, the joint coding of the first parameter sets corresponding to a single or two transmission blocks enabled refers to the joint coding of two or three of the following information. In the joint coding of three types of information, the first parameter set includes number of transmission layers, scrambling identity, and antenna port; and in the joint coding of two types of information, the first parameter set includes number of transmission layers, and antenna port.

In the above-mentioned Table 4, the second parameter set at least includes one or more of the following parameters: cell identity, number of transmitting antennae (number of CRS ports), MB-SFN subframe configuration information, CSI-RS pattern, and non-zero power CSI-RS bitmap.

For example, the above-mentioned second parameter set includes cell identity, number of CRS ports, and MB-SFN subframe configuration information. For another example, the above-mentioned second parameter set includes cell identity, number of transmitting antennae (number of CRS ports), MB-SFN subframe configuration information, and CSI-RS pattern. For still another example, the above-mentioned second parameter set includes cell identity, number of transmitting antennae (number of CRS ports), MB-SFN sub frame configuration information, non-zero power CSI-RS pattern, and zero power CSI-RS pattern.

Embodiment 5

The method listed in the above-mentioned embodiments and example embodiments may also include: selecting one second parameter set from $2^{X2}$ second parameter sets (e.g., the two second parameter set listed in the above-mentioned embodiments) through downlink control signalling. As to the mode how the high layer defines the above-mentioned $2^{X2}$ second parameter sets, an example embodiment is described below, certainly other equivalent modes employed by the high layer for defining the $2^{X2}$ second parameter sets may also be applied to the method as described in the embodiments or example embodiments of the disclosure.

At the network side, the high layer defines M candidate second parameter sets, and configures UE with $2^{X2}$ indexes, for selecting $2^{X2}$ second parameter sets from the M candidate second parameter sets. After selecting $2^{X2}$ second parameter sets from the M candidate second parameter sets, the network side transmits downlink control signalling to the terminal, wherein the downlink control signalling includes a field, X1 bits in the X bits constituting this field are used for indicating the above-mentioned first parameter set, and X2 bits in the X bits are used for indicating the above-mentioned second parameter set.

It should be noted that the above-mentioned method embodiment, including the high layer selecting $2^{X2}$ second parameter sets from M candidate second parameter sets and then indicating to use one second parameter set in the $2^{X2}$ second parameter set via control signalling, is also applicable to the device corresponding thereto. Therefore, by the above-mentioned embodiments and example embodiments, the network side may semi-statically select $2^{X2}$ second parameter sets from the M candidate second parameter sets, and then dynamically select one second parameter set from the $2^{X2}$ second parameter sets, to determine the second parameter set by a mode combining the semi-static selection and the dynamic selection, so as to avoid the interference of the reference signals CRS among cells as far as possible.

In addition, the relationship between the states and the signalling bit values in the above-mentioned embodiments and example embodiments can be exchanged arbitrarily, and all the solutions with the same state descriptions are included in the protection scope of the disclosure.

Obviously, a person skilled in the art would understand that the above components and steps of the disclosure can be realized by using general purpose calculating device, can be integrated in one calculating device or distributed on a network which consists of a plurality of calculating devices, and alternatively they can be realized by using the executable program code of the calculating device, so that consequently they can be stored in the storing device and executed by the calculating device, in some cases, can perform the shown or described step in sequence other than herein, or they are made into integrated circuit component respectively, or a plurality of components or steps thereof are made into one integrated circuit component. Thus, the disclosure is not limited to any particular combination of hardware and software.

The above description is only example embodiments of the disclosure and is not intended to limit the disclosure, and the disclosure can have a variety of changes and modifications for ordinary person skilled in the field. Any modification, equivalent replacement, or improvement made without departing from the principle of the disclosure should fall within the protection scope as defined by the appended claims of the disclosure.

What is claimed is:

1. A control information processing method, comprising:
receiving, by a base station, high-layer configuration signalling, wherein the high-layer configuration signalling is used for determining an indication mode of X bits in a control information format, the indication mode of the X bits comprising at least one of the following: all of the X bits being used for indicating a first parameter set of at least one enabled transmission block in the control information, and the X bits being used for indicating a first parameter set and a second parameter set of at least one enabled transmission block in the control information, where X is a positive integer greater than or equal to 3; and generating, by the base station, a control information format according to the high-layer configuration signalling, and transmitting, by the by the base station, the generated control information format to user equipment (UE).

2. The method according to claim 1, wherein the indication mode of the X bits is: the X bits being used for indicating the first parameter set and the second parameter set of at least one enabled transmission block in the control information which comprises:

X1 bits in the X bits being used for indicating the first parameter set, and X2 bits in the X bits being used for indicating the second parameter set, wherein the X1 bits are used for indicating joint coding of different first parameter sets when there are different number of transmission blocks, the X2 bits are used for selecting one second parameter set from $2^{X2}$ second parameter sets which are defined by high-layer configuration signalling; or the X bits being used for indicating a combination constituted by the first parameter set and the second parameter set, wherein the X bits comprise $2^X$ states, $2^{X1}$ states of the $2^X$ states being used for indicating joint coding of different first parameter sets when there are different number of transmission blocks, $2^{X2}$ states of the $2^X$ states being used for selecting one second parameter set from $2^{X2}$ second parameter sets which are defined by high-layer configuration signalling;

where X=X1+X2, and each of X1 and X2 is a positive integer greater than or equal to 1.

3. The method according to claim 1, wherein the generating the control information format according to the high-layer configuration signalling comprises:

according to the high-layer configuration signalling, selecting from indication modes an indication mode of the X bits for generating the control information format; and generating the control information format according to the selected indication mode.

4. The method according to claim 1, wherein the first parameter set comprises at least one of the following parameters:

number of layers of cell signal transmission, scrambling identity, and antenna port.

5. The method according to claim 1, wherein the second parameter set comprises at least one of the following parameters:

cell identity, Multicast Broadcast-Single Frequency Network (MB-SFN) subframe configuration information, number of Common Reference Signal (CRS) ports, Channel State Information-Reference Symbol (CSI-RS) pattern, non-zero power CSI-RS pattern, and zero power CSI-RS pattern.

6. The method according to claim 1, wherein the second parameter set comprises the following parameters:

cell identity, Multicast Broadcast-Single Frequency Network (MB-SFN) subframe configuration information, and number of Common Reference Signal (CRS) ports; or cell identity, Multicast Broadcast-Single Frequency Network (MB-SFN) subframe configuration information, number of Common Reference Signal (CRS) ports, and Channel State Information-Reference Symbol (CSI-RS) pattern.

7. The method according to claim 2, wherein the generating the control information format according to the high-layer configuration signalling comprises:

according to the high-layer configuration signalling, selecting from indication modes an indication mode of the X bits for generating the control information format; and generating the control information format according to the selected indication mode.

8. The method according to claim 2, wherein the first parameter set comprises at least one of the following parameters:

number of layers of cell signal transmission, scrambling identity, and antenna port.

9. The method according to claim 2, wherein the second parameter set comprises at least one of the following parameters:

cell identity, Multicast Broadcast-Single Frequency Network (MB-SFN) subframe configuration information, number of Common Reference Signal (CRS) ports, Channel State Information-Reference Symbol (CSI-RS) pattern, non-zero power CSI-RS pattern, and zero power CSI-RS pattern.

10. The method according to claim 2, wherein the second parameter set comprises the following parameters:

cell identity, Multicast Broadcast-Single Frequency Network (MB-SFN) subframe configuration information, and number of Common Reference Signal (CRS) ports; or cell identity, Multicast Broadcast-Single Frequency Network (MB-SFN) subframe configuration information, number of Common Reference Signal (CRS) ports, and Channel State Information-Reference Symbol (CSI-RS) pattern.

11. A base station, comprising a hardware processor and a memory, and the hardware processor is configured to execute program components stored in the memory, wherein the program components comprise:

a receiving component configured to receive high-layer configuration signalling, wherein the high-layer configuration signalling is used for determining an indication mode of X bits in a control information format, the indication mode of the X bits comprising at least one of the following: all of the X bits being used for indicating a first parameter set of at least one enabled transmission block in the control information, and the X bits being used for indicating a first parameter set and a second parameter set of at least one enabled transmission block in the control information, where X is a positive integer greater than or equal to 3; and a generation component configured to generate a control information format according to the high-layer configuration signalling;

a transmitting component configured to transmit the generated control information format to user equipment (UE).

12. The base station according to claim 11, wherein the indication mode of the X bits is the X bits being used for indicating the first parameter set and the second parameter set of at least one enabled transmission block in the control information which comprises:

X1 bits in the X bits being used for indicating the first parameter set, and X2 bits in the X bits being used for indicating the second parameter set, wherein the X1 bits are used for indicating joint coding of different first parameter sets when there are different number of transmission blocks, the X2 bits are used for selecting one second parameter set from 2X2 second parameter sets which are defined by high-layer configuration signalling; or the X bits being used for indicating a combination constituted by the first parameter set and the second parameter set, wherein the X bits comprise 2X states, 2X1 states of the 2X states being used for indicating joint coding of different first parameter sets when there are different number of transmission blocks, 2X2 states of the 2X states being used for selecting one second parameter set from 2X2 second parameter sets which are defined by high-layer configuration signalling;

where X=X1+X2, and each of X1 and X2 is a positive integer greater than or equal to 1.

13. The base station according to claim 11, wherein the generation component comprises:
   a selection unit configured to, according to the high-layer configuration signalling, select from indication modes an indication mode of the X bits for generating the control information format; and
   a generation unit configured to generate the control information format according to the selected indication mode.

14. The base station according to claim 11, wherein the first parameter set comprises at least one of the following parameters:
   number of layers of cell signal transmission, scrambling identity, and antenna port.

15. The base station according to claim 11, wherein the second parameter set comprises at least one of the following parameters:
   cell identity, Multicast Broadcast-Single Frequency Network (MB-SFN) subframe configuration information, number of Common Reference Signal (CRS) ports, Channel State Information-Reference Symbol (CSI-RS) pattern, non-zero power CSI-RS pattern, and zero power CSI-RS pattern.

16. The base station according to claim 11, wherein the second parameter set comprises the following parameters:
   cell identity, Multicast Broadcast-Single Frequency Network (MB-SFN) subframe configuration information, and number of Common Reference Signal (CRS) ports; or
   cell identity, Multicast Broadcast-Single Frequency Network (MB-SFN) subframe configuration information, number of Common Reference Signal (CRS) ports, and Channel State Information-Reference Symbol (CSI-RS) pattern.

17. The base station according to claim 12, wherein the generation component comprises:
   a selection unit configured to, according to the high-layer configuration signalling, select from indication modes an indication mode of the X bits for generating the control information format; and
   a generation unit configured to generate the control information format according to the selected indication mode.

18. The base station according to claim 12, wherein the first parameter set comprises at least one of the following parameters:
   number of layers of cell signal transmission, scrambling identity, and antenna port.

19. The base station according to claim 12, wherein the second parameter set comprises at least one of the following parameters:
   cell identity, Multicast Broadcast-Single Frequency Network (MB-SFN) subframe configuration information, number of Common Reference Signal (CRS) ports, Channel State Information-Reference Symbol (CSI-RS) pattern, non-zero power CSI-RS pattern, and zero power CSI-RS pattern.

20. The base station according to claim 12, wherein the second parameter set comprises the following parameters:
   cell identity, Multicast Broadcast-Single Frequency Network (MB-SFN) subframe configuration information, and number of Common Reference Signal (CRS) ports; or
   cell identity, Multicast Broadcast-Single Frequency Network (MB-SFN) subframe configuration information, number of Common Reference Signal (CRS) ports, and Channel State Information-Reference Symbol (CSI-RS) pattern.

* * * * *